(12) United States Patent
Ozaki (10) Patent No.: US 8,001,506 B2
(45) Date of Patent: Aug. 16, 2011

(54) SIMD IMAGE FORMING APPARATUS FOR MINIMIZING WIRING DISTANCE BETWEEN REGISTERS AND PROCESSING DEVICES

(75) Inventor: Tomoaki Ozaki, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 338 days.

(21) Appl. No.: 12/356,674

(22) Filed: Jan. 21, 2009

(65) Prior Publication Data

US 2009/0187737 A1    Jul. 23, 2009

(30) Foreign Application Priority Data

Jan. 22, 2008   (JP) ................................ 2008-011304

(51) Int. Cl.
*G06F 17/50*   (2006.01)
(52) U.S. Cl. ............ 716/110; 716/118; 716/119; 712/22
(58) Field of Classification Search ........................ None
See application file for complete search history.

(56) References Cited

U.S. PATENT DOCUMENTS

| | | | | |
|---|---|---|---|---|
| 6,408,427 | B1 * | 6/2002 | Cong et al. ................... | 716/129 |
| 7,096,449 | B1 * | 8/2006 | Teig et al. .................... | 716/129 |
| 7,155,693 | B1 * | 12/2006 | Rodman ...................... | 716/122 |
| 2009/0070554 | A1 * | 3/2009 | Wang et al. ................... | 712/205 |

FOREIGN PATENT DOCUMENTS

| | | |
|---|---|---|
| JP | 8-297650 | 11/1996 |
| JP | 2005-202657 | 7/2005 |
| JP | 2006-522399 | 9/2006 |
| JP | 3971535 | 6/2007 |
| JP | 2008-217061 | 9/2008 |
| WO | WO2004/090716 A1 | 10/2004 |

OTHER PUBLICATIONS

Rixner et al.; Register Organization for Media Processing; 2000; HPCA '00.*

Kujoth et al.; A wire delay-tolerant reconfigurable unit for a clustered programmable-reconfigurable processor; 2006; ScienceDirect.*

* cited by examiner

*Primary Examiner* — Eddie Chan
*Assistant Examiner* — Corey S Faherty
(74) *Attorney, Agent, or Firm* — Cooper & Dunham LLP (57) ABSTRACT

A disclosed image processing apparatus includes a SIMD microprocessor in which multiple processor elements are arranged in one dimension, each of the processor elements including multiple access registers arranged in stages for storing image data; and multiple data processing devices corresponding one-to-one with the stages of the access registers, arranged in one dimension in the same direction as the processor elements, and configured to read and write image data from/to the access registers. The access registers of each of the stages, each of which access registers is included in a different one of the processor elements, are connected with a common line. Wiring outlets, each of which connects the common line of a different one of the stages to a corresponding data processing device, are individually disposed within the SIMD microprocessor in such a manner that each wiring outlet has a shortest possible distance to the corresponding data processing device.

6 Claims, 6 Drawing Sheets

SIMD IMAGE FORMING APPARATUS FOR MINIMIZING WIRING DISTANCE BETWEEN REGISTERS AND PROCESSING DEVICES

BACKGROUND OF THE INVENTION

1. Field of the Invention

The present invention is directed to a SIMD (Single Instruction-stream, Multiple Data-stream) microprocessor having a capability of parallel data processing for multiple data pieces with a single operating instruction.

2. Description of the Related Art

SIMD microprocessors are capable of simultaneously performing the same calculation operation on multiple data pieces with a single instruction. SIMD microprocessors have been therefore frequently used for processes involving a repetition of the same set of calculation steps over extremely large amounts of data (for example, image processing of digital copiers).

In image processing of a SIMD microprocessor, a high-speed calculation operation is achieved by aligning multiple operations units (processor elements (PE)) in the image-data main scanning direction and executing the same calculation steps with multiple data pieces at the same time.

Pre-operation pixel data pieces to be input to a calculating unit of each processor element and post-operation pixel data pieces are stored in multiple register files provided in the processor element.

For example, a SIMD processor disclosed in Patent Document 1 is provided with an external data processing device capable of accessing the register files. The data processing device inputs and outputs image data pieces between the register files and an external image memory in the background of the calculation operations of the calculating units in the processor elements, thereby improving the performance of the image processing apparatus. [Patent Document 1] Japanese Patent No. 3971535

To obtain further improvement in the performance of the SIMD processor described in Patent Document 1, the following schemes are conceivable:

(a) to increase the operating frequency;
(b) to increase the number of processor elements; and
(c) to increase the number of external data processing devices capable of accessing the register files.

Among the three schemes, if (b) and (c) were implemented at the same time, the following problems would occur. That is, in the case where the SIMD processor allows external data processing devices to access register files belonging to arbitrary processor elements, as in the case of Patent Document 1, a significantly large number of wiring lines are necessary in order to connect the external data processing devices and the register files. Furthermore, outlets need to be provided to connect wiring lines, extending from one end of one-dimensionally arranged processor elements to the other end, to the external data processing devices. In this case, if all the outlets are disposed near the central part of the PE array (a group of the one-dimensionally arranged processor elements) so that each wiring line equally extends from the wiring outlet to a processor element on each end, the wiring lines are concentrated between the vicinity of the central part of the PE array and the data processing devices.

Figure 6:
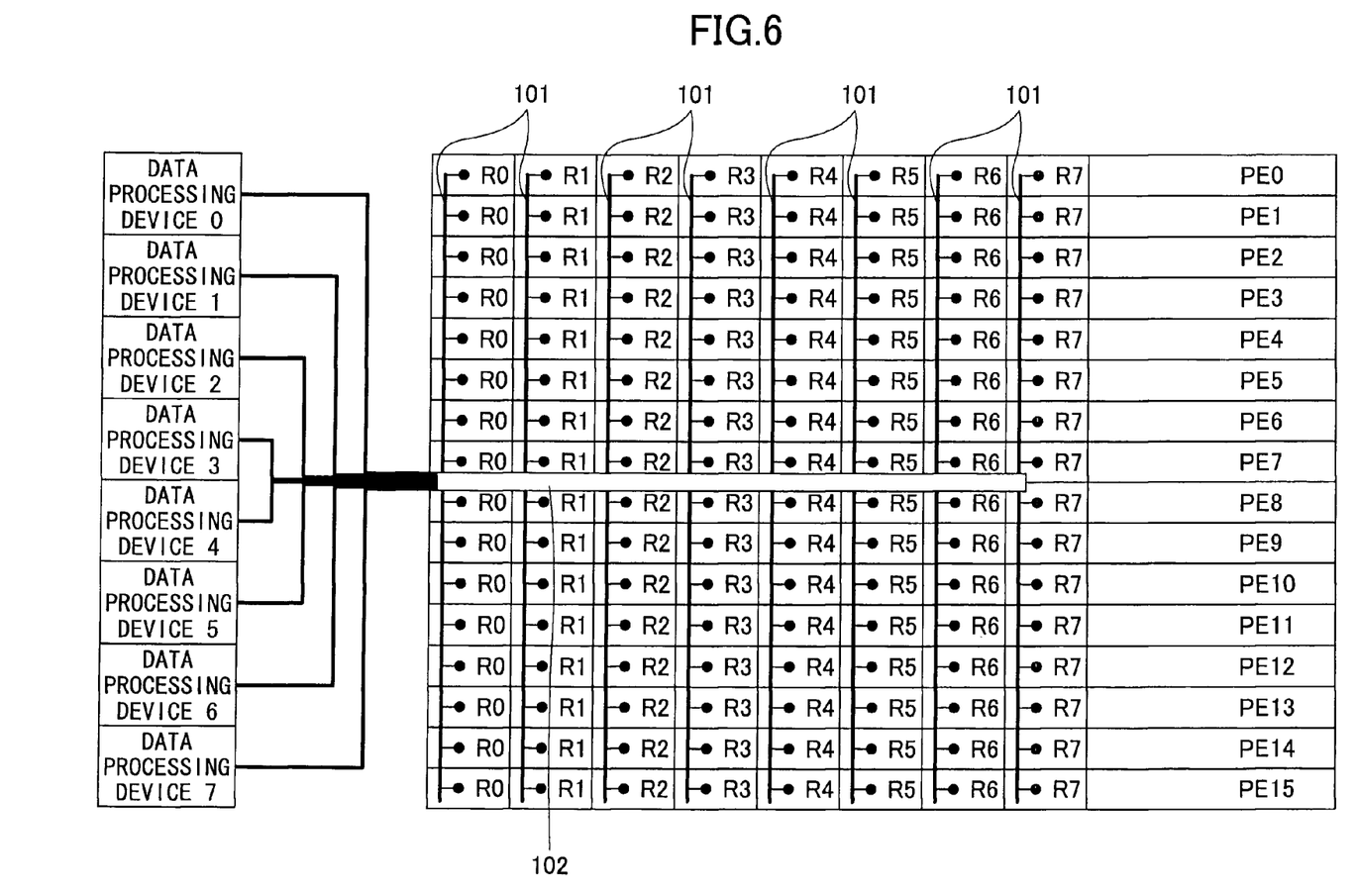
FIG. 6 illustrates wiring connections between data processing devices and access registers in a conventional image processing apparatus.

The above-described problems are explained with reference to an example of FIG. 6. FIG. 6 illustrates sixteen processor elements (PE0 through PE15) arranged in one dimension and eight data processing devices (0 through 7) arranged one dimensionally in the same direction as the alignment of the processor elements. Each processor element has a register file which includes eight access registers (R0 through R7). Wiring lines 101 each extending from the top processor element (PE0) of the one-dimensionally arranged processor elements to the bottom processor element (PE15) need to be connected to the data processing devices 0 through 7. In this case, outlets 102 used to draw out the wiring lines 101 toward the data processing devices 0 through 7 are all provided near the central part of the PE array so that all wiring lines 101 equally extend from the outlet 102 to the top and bottom processor elements (PE0 and PE15). Accordingly, the wiring lines are concentrated between the vicinity of the central part of the PE array and the data processing devices.

This arrangement poses serious implementation problems, such as causing great variation in the length of the wiring lines between the external data processing devices and the outlets 102. Moreover, the arrangement is a possible cause of decreasing the communication speed between the external data processing devices and the PE register files.

The present invention aims at solving these problems. That is, in view of the above problems, the present invention aims at providing a high-performance image processing apparatus by solving the issues of excessive wiring lines associated with an increase in the number of processor elements and the number of external data processing devices and communication speed slowdowns due to the wiring lines of increased length.

SUMMARY OF THE INVENTION

In order to resolve the above-mentioned problems, one embodiment of the present invention may be an image processing apparatus including a SIMD microprocessor in which multiple processor elements are arranged in one dimension, each of the processor elements including multiple access registers arranged in stages for storing image data; and multiple data processing devices corresponding one-to-one with the stages of the access registers, arranged in one dimension in the same direction as the processor elements, and configured to read and write image data from/to the access registers. The access registers of each of the stages, each of which access registers is included in a different one of the processor elements, are connected with a common line. Wiring outlets, each of which connects the common line of a different one of the stages to a corresponding data processing device, are individually disposed within the SIMD microprocessor in such a manner that each wiring outlet has the shortest possible distance to the corresponding data processing device.

Another embodiment of the present invention may be an image processing apparatus including a SIMD microprocessor in which multiple processor elements are arranged in one dimension, each of the processor elements including multiple access registers arranged in stages for storing image data; and multiple data processing devices corresponding one-to-one with the stages of the access registers, arranged in one dimension in the same direction as the processor elements, and configured to read and write image data from/to the access registers. The access registers of each of the stages, each of which access registers is included in a different one of the processor elements, are connected with a corresponding one of multiple common lines. Multiple shared wiring outlets, each of which is connected to two or more of the common lines of different one of the stages and is also connected to corresponding data processing devices, are disposed within the SIMD microprocessor in such a manner that each shared wiring outlet has a shortest summed distance to the corresponding data processing devices.

Another embodiment of the present invention may be a wiring outlet positioning method used on the above-described image processing apparatus. The wiring outlet positioning method includes the steps of providing a common line connecting the access registers of each of the stages, each of which access registers is included in a different one of the processor elements; and individually disposing wiring outlets, each of which connects the common line of a different one of the stages to a corresponding data processing device, within the SIMD microprocessor in such a manner that each wiring outlet has a shortest possible distance to the corresponding data processing device.

Another embodiment of the present invention may be a wiring outlet positioning method used on the above-described image processing apparatus. The wiring outlet positioning method includes the steps of providing a common line connecting the access registers of each of the stages, each of which access registers is included in a different one of the processor elements; and disposing multiple shared wiring outlets, each of which is connected to two or more of the common lines of different ones of the stages and is also connected to corresponding data processing devices, within the SIMD microprocessor in such a manner that each shared wiring outlet has a shortest summed distance to the corresponding data processing devices.

DETAILED DESCRIPTION OF THE PREFERRED EMBODIMENTS

First Embodiment

Figure 1:
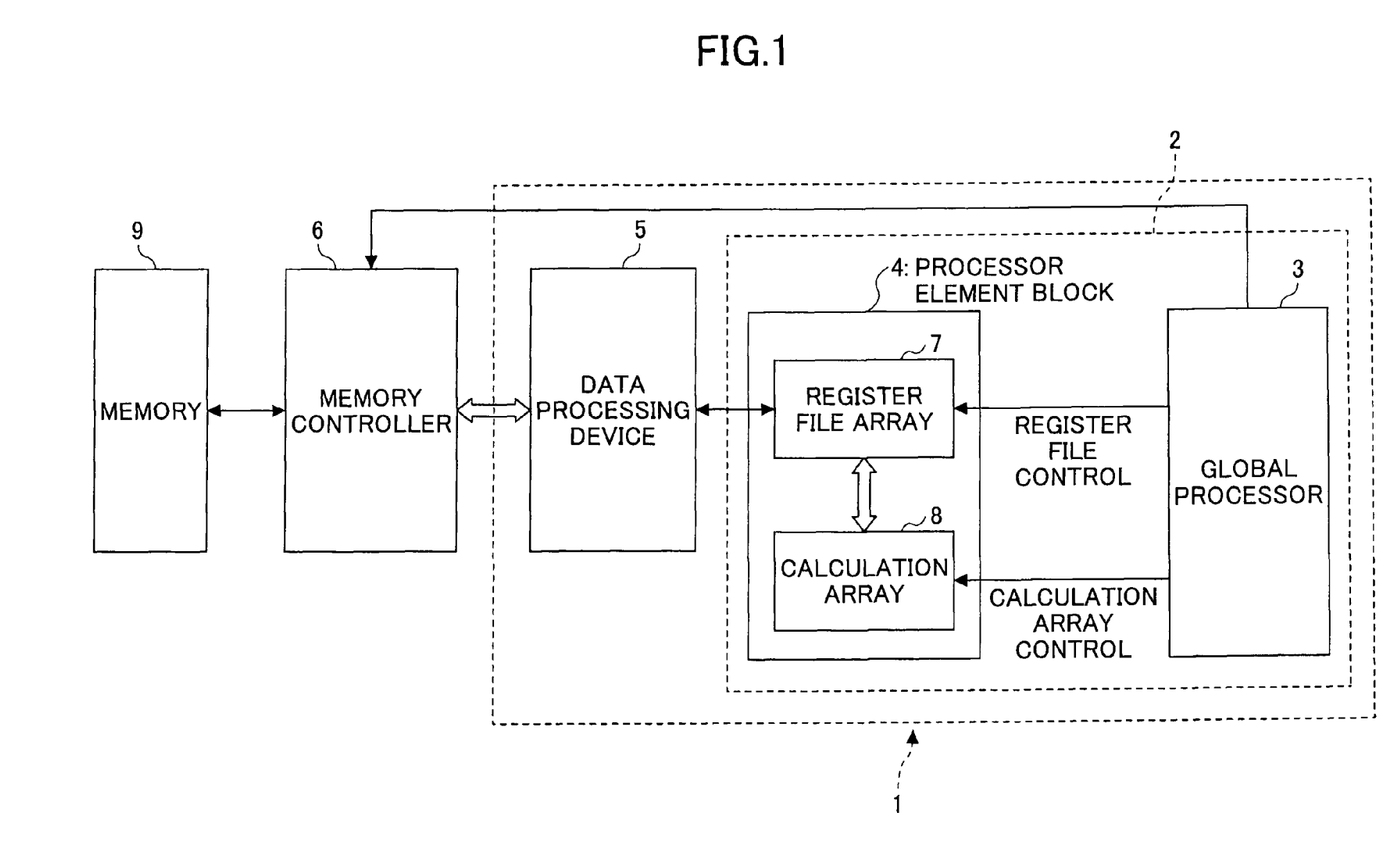
FIG. 1 is a block diagram of an image processing apparatus according to the first embodiment of the present invention.
Figure 2:
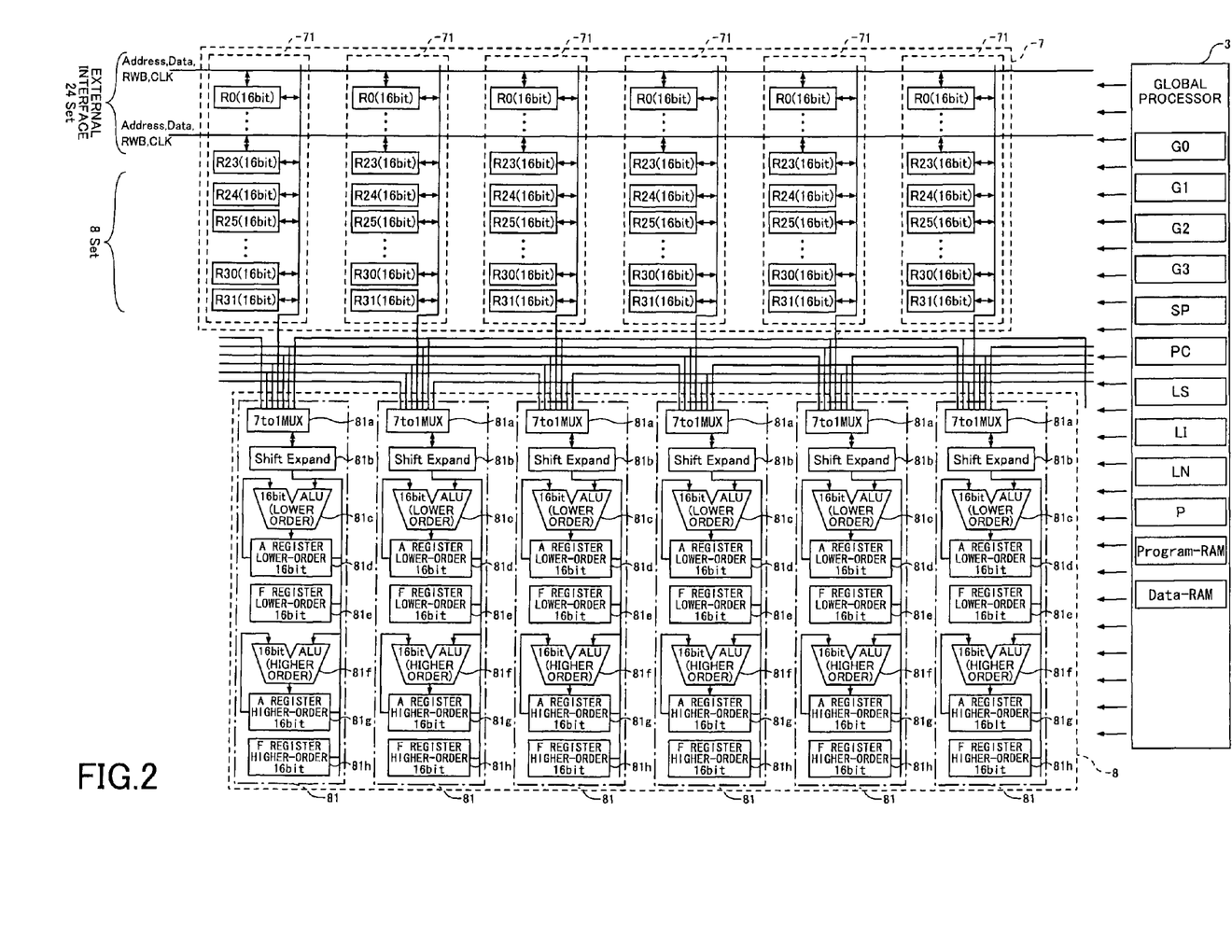
FIG. 2 is a block diagram of a SIMD microprocessor of the image processing apparatus of FIG. 1.
Figure 3:
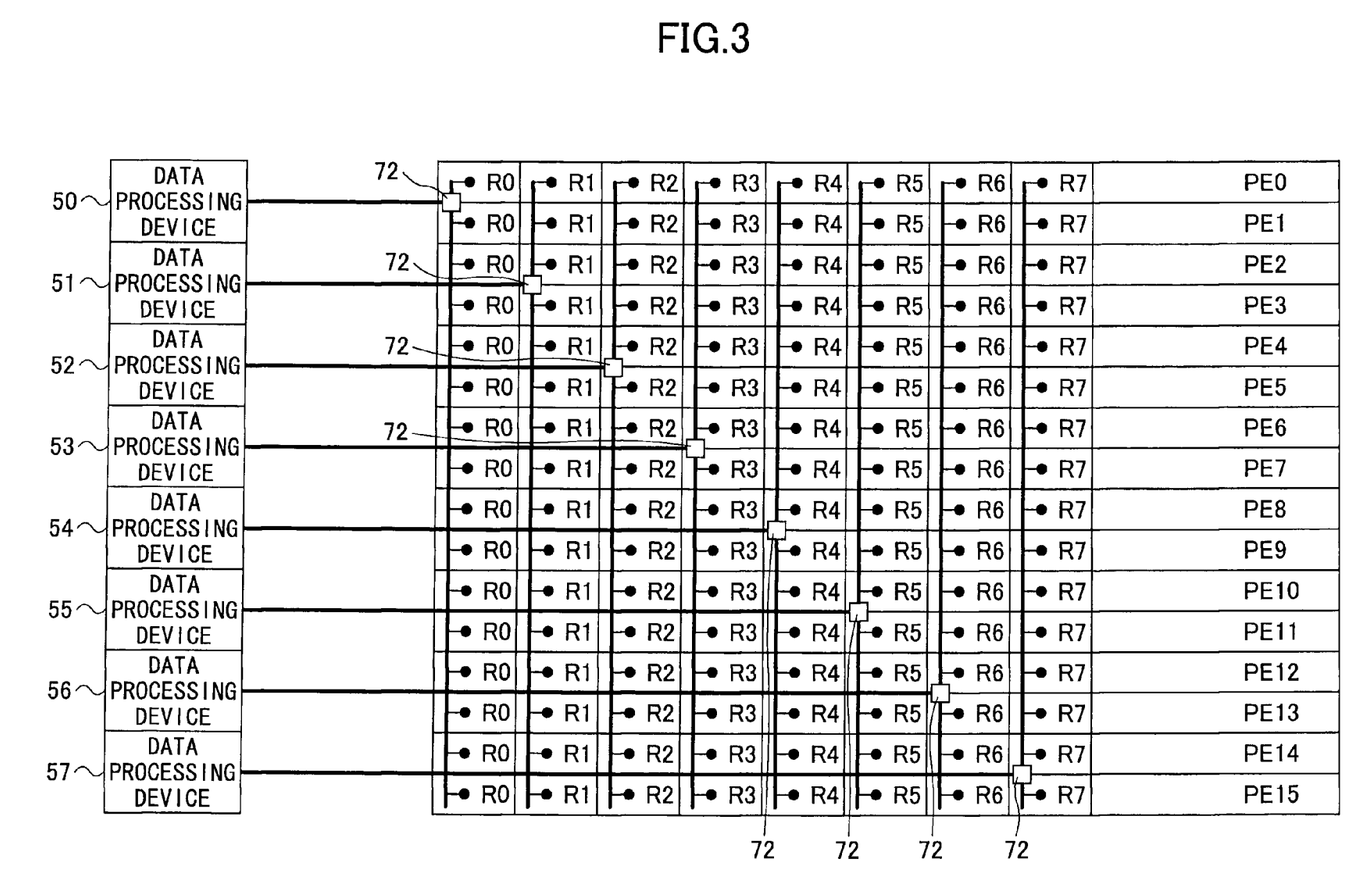
FIG. 3 illustrates wiring connections between data processing devices and access registers in the image processing apparatus of FIG. 1.

Next is described the first embodiment of the present invention with reference to FIGS. 1 through 3. FIG. 1 is a block diagram of an image processing apparatus according to the first embodiment of the present invention. FIG. 2 is a block diagram of a SIMD microprocessor of the image processing apparatus of FIG. 1. FIG. 3 illustrates wiring connections between data processing devices and access registers in the image processing apparatus of FIG. 1.

The image processing apparatus 1 of FIG. 1 includes a SIMD microprocessor 2 and data processing devices 5.

The SIMD microprocessor 2 includes a global processor 3 and a processor element block 4.

As shown in FIG. 2, the global processor 3 has a built-in Program-RAM for storing programs to be executed by the global processor 3 and a built-in Data-RAM for storing operational data. Furthermore, the global processor 3 includes a program counter (PC) for storing addresses of the programs; versatile registers such as G0-G3 registers for storing data of calculation operations; a stack pointer (SP) for storing an address within the data-RM at which data is saved during register saving and restoring periods; a link register (LS) for storing a call originating address during a subroutine call; a link interrupt (LI) register and a link non-maskable interrupt (LN) register for storing jump origin addresses during interrupt request (IRQ) and non-maskable interrupt request (NMI) periods, respectively; and a processor status register (P) for storing the status of the global processor 3. Using these registers as well as an instruction decoder, an arithmetic and logic unit (ALU), a memory control circuit, an interrupt control circuit, an external I/O control circuit, a GP calculation control circuit (all not shown), global processor instructions (GP instructions) are executed. When PE instructions are executed, a register file array 7 and a calculation array 8, to be described below, are controlled using the instruction decoder, a register file control circuit and a PE calculation circuit (all not shown).

The processor element block 4 includes the register file array 7 and the calculation array 8.

The register file array 7 includes register files 71, the number of which corresponds to that of processor elements. Each register file 71 contains 32 16-bit registers, which are referred to as R0-R31 with respect to each processor element. Each register has a port connected to the calculation array 8, and 16-bit read/write buses (hereinafter "register buses") allow access to the resisters from the calculation array 8. Note that FIG. 2 illustrates only six registers for each processor element due to space limitation.

The calculation array 8 includes calculating units 81, the number of which corresponds to that of processor elements. Each calculating unit 81 contains a 16-bit 7 to 1 multiplexer (7 to 1 MUX) 81a for connecting to register files 71. Specifically, each 7 to 1 MUX 81a is connected to register buses of three processor elements on the left-hand side of the 7 to 1 MUX 81a and register buses of three processor elements on the right-hand side as well as to a register bus of a processor element to which the 7 to 1 MUX 81a corresponds, thereby allowing selection of a calculation target. The selection is controlled by the global processor 3.

Behind the 7 to 1 MUX 81a, a shifter (Shift Expand) 81b is provided for performing bit shift and bit extension operations on data read from the corresponding register file 71. The shift operation is controlled by the global processor 3.

Behind the shifter 81b, a higher-order 16-bit ALU 81f, a higher-order 16-bit A register 81g, a higher-order 16-bit F register 81h, a lower-order 16-bit ALU 81c, a lower-order 16-bit A register 81d and a lower-order 16-bit F register 81e are provided. In response to a PE instruction, a calculation operation is performed on data read from the corresponding register file 71 generally in the following manner. As for the higher order, for example, the data is supplied to one of two inputs of the higher-order 16-bit ALU 81f, and content of the higher-order 16-bit A register 81g is supplied to the other input of the higher-order 16-bit ALU 81f. The result is then stored in the higher-order 16-bit A register 81g. Accordingly, calculation operations of the higher-order 16-bit A register 81g and the R0-R31 registers are performed. The same applies to the lower-order 16-bit ALU 81c.

The higher-order 16-bit ALU 81f and the lower-order 16-bit ALU 81c are capable of performing 16-bit calculations individually. Alternatively, these ALUs are also capable of working in conjunction with each other to perform 32-bit calculations together. Each operation is controlled by the global processor 3. In order to allow the higher-order 16-bit ALU 81f and the lower-order 16-bit ALU 81c to work in conjunction with each other, a communication pathway, such as carry, is provided between these ALUs.

That is to say, a register file 71 and a calculating unit 81 described above form one processor element.

The data processing devices 5 read/write image data from/ to 24 columns of registers (R0-R23) of the resister files 71 using data buses and control signals. That is, the R0-R23 registers correspond to access registers. The phrase "including a plurality of access resisters arranged in stages" as defined in the appended claims means including multiple columns of access registers. To make an access to an arbitrary register of a processor element from a data processing device 5, an address is used as in the case of accessing a memory. Each register accessible from the data processing devices 5 is assigned a unique address. A data processing device 5 outputs a control signal including the address of a register to which access is sought. Each register connected to the data bus compares its own address with the address in the control signal output from the data processing device 5, and if these addresses match, the register responds to the access request.

As shown in FIG. 1, a memory controller 6 and a memory 9 are provided outside the image processing apparatus 1.

The memory controller 6 is configured to write to the memory 9 image data input from the register files 71 via the data processing devices 5, and output image data read from the memory 9 to the register files 71 via the data processing devices 5.

Next are described wiring connections between the data processing devices 5 and the R0-R23 registers of each register file 71 accessible from the data processing devices 5, with reference to FIG. 3.

In FIG. 3, there are 16 processor elements, PE0 through PE15. For the sake of simple representation, FIG. 3 depicts only eight access registers, R0 through R7 and omits the calculating units 81. As for the data processing devices 5, only eight devices corresponding to R0 through R7 are illustrated. Specifically, in FIG. 3, a data processing device 50 is able to access the R0 registers of the processor elements PE0-PE15; a data processing device 51, the R1 registers of the processor elements PE0-PE15; a data processing device 52, the R2 registers of the processor elements PE0-PE15; a data processing device 53, the R3 registers of the processor elements PE0-PE15; a data processing device 54, the R4 registers of the processor elements PE0-PE15; a data processing device 55, the R5 registers of the processor elements PE0-PE15; a data processing device 56, the R6 registers of the processor elements PE0-PE15; and a data processing device 57, the R7 registers of the processor elements PE0-PE15. In this condition, each data processing device 50 through 57 is configured to communicate with the corresponding access register of an arbitrary processor element by specifying a PE number of the processor element as an address.

Communications between one data processing device and one access register require signal lines for a clock, an address (PE number), read/write control, write data and read data. For example, in the case of FIG. 3 where there are 16 processor elements, each address requires 4 bits, and thus, 38 wiring lines (=1+4+1+16+16) are necessary between a data processing device 5 and an access register.

These wiring lines are output from each data processing device 5, connected to a wiring outlet 72 provided in the processor element block 4, and then divided into two directions, toward access registers of processor elements on the upper side and on the lower side of FIG. 3 in relation to the outlet 72. To the bifurcating-line sets (i.e. the upper-side line set and the lower-side line set), the corresponding access registers (having the same name) of the processor elements are connected. For example, the R0 registers of all the processor elements are connected to the corresponding bifurcating-line sets. The bifurcating-line sets are common lines, and the outlet 72 is provided for connecting the common lines toward the corresponding data processing device 50. The phrase "including a plurality of access resisters arranged in stages" as defined in the appended claims, more specifically, indicates not only the number of columns of registers but also the alignment sequence of the registers, such as R0, R1, R2 . . . Therefore, the term "access registers of each of the stages" in the appended claims means, for example, sixteen R0 registers of the processor elements PE0-PE16.

In the present embodiment, each wiring outlet 72 is disposed in such a manner so as to have the shortest distance to the corresponding data processing device 5, unlike the conventional configuration in which the wiring outlets are disposed near the central part of the register file array 7 so that the bifurcating-line sets corresponding to each wiring outlet equally extend from the wiring outlet to the uppermost access register (one end) and to the lowermost access register (the other end).

As has been described above, the present embodiment of the image processing apparatus 1 includes the SIMD microprocessor 2 having the multiple access registers R0-R7 in the processor elements; and the data processing devices 50 through 57 provided in correspondence with the access resisters R0-R7 and designed for performing reading and writing operations of the corresponding access registers. According to the present embodiment of the image processing apparatus 1, the outlets 72 of the wiring lines connecting the data processing devices 50 through 57 and the access registers R0-R7 are disposed in such a manner that each outlet 72 has the shortest distance to the corresponding data processing device 5. Accordingly, it is possible to shorten the line length from each wiring outlet 72 in the processor element block 4 to the corresponding data processing device 5. In addition, compared to the case where all wiring outlets 72 are provided near the central part of the register files 71, the concentration of the wiring lines at a local spot can be reduced.

As described above, since communications of one pair (i.e. one data processing device and one access register) requires 38 wiring lines, a total of 304 wiring lines are necessary in the case of FIG. 3. In addition, if there are 24 columns of access registers, which is a practical situation of the present embodiment, 24 data processing devices 5 are necessary, which in turn requires 912 wiring lines. Furthermore, in practice, it is common to have a large number of processor elements, such as 256, 512 or 1024. Since the increase in the number of data processing devices 5 is essential in achieving further improvement in performance of image processing apparatuses, it is of considerable significance to design new implementations in view of the wiring connections between the access registers and the data processing devices.

Second Embodiment

Figure 4:
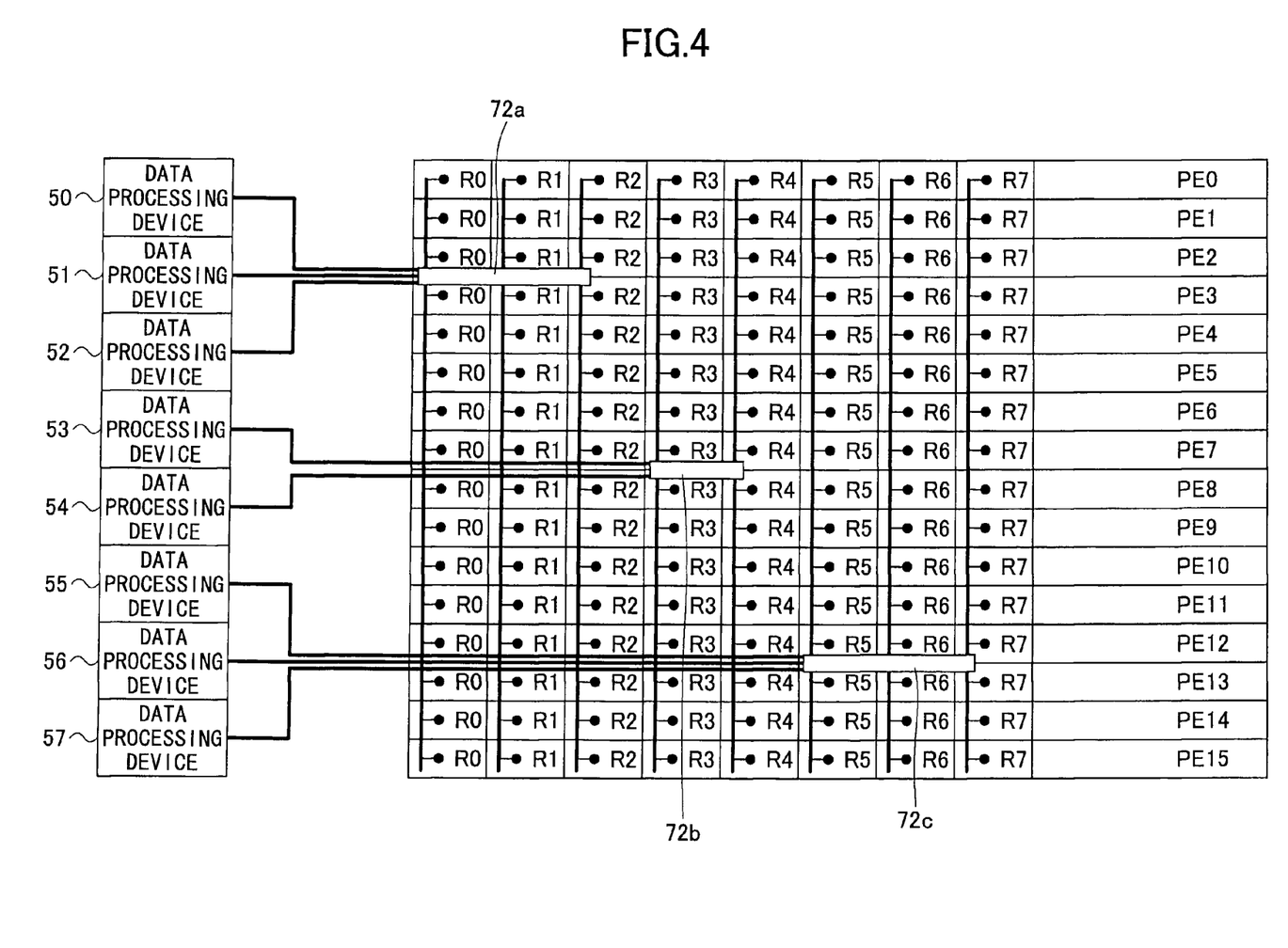
FIG. 4 illustrates wiring connections between data processing devices and access registers according to the second embodiment.

Next is described the second embodiment of the present invention with reference to FIG. 4. Note that the same reference numerals are given to the components which are common to the above-described first embodiment, and their explanations are omitted. FIG. 4 illustrates wiring connections between data processing devices and access registers according to the second embodiment.

The image processing apparatus 1 of the present embodiment has the same basic structure as that in the first embodiment; however, it differs from the first embodiment in that three grouping wiring outlets are disposed in the processor element block 4 (more specifically, in the register file array 7) in a dispersed manner, instead of providing the individual wiring outlets 72 for the respective data processing devices 5.

The three grouping outlets include an outlet 72a for connecting the common lines of the R0, R1 and R2 registers (first group) toward the data processing devices 50 through 52; an outlet 72b for connecting the common lines of the R3 and R4 registers (second group) toward the data processing devices 53 and 54; and an outlet 72c for connecting the common lines of the R5, R6 and R7 registers (third group) toward the data processing devices 55 through 57. That is to say, common lines of access registers connected to data processing devices adjacent to each other are grouped to share the same outlet (72a, 72b or 72c).

For example, in the case of the first group, if the outlet 72a is disposed at a position suitable for the data processing device 50, the wiring lines for the data processing device 52 become long. On the other hand, if the outlet 72a is disposed at a position suitable for the data processing device 52, the wiring lines for the data processing device 50 become long. Therefore, the outlet 72a is disposed near the halfway point between the data processing devices 50 and 52. That is, the outlet 72a is disposed such a manner so as to have the shortest summed distance to the three data processing devices 50 through 52 when these data processing devices 50 through 52 are seen as one group. Herewith, the wiring lines can be shortened, and it is also possible to reduce variation in the length of the bifurcating-line sets extending from each wiring outlet to an access register of both the top and bottom processor elements in FIG. 4.

According to the present embodiment, since the wiring outlets are grouped into three wiring outlets 72a, 72b and 72c, the concentration of the wiring lines between the data processing devices 5 and the outlets can be dispersed into three different spots. Also, as compared to the first embodiment, it is possible to reduce variation in the length of the bifurcating-line sets extending from each wiring outlet to access registers of both of the endmost processor elements.

Third Embodiment

Figure 5:
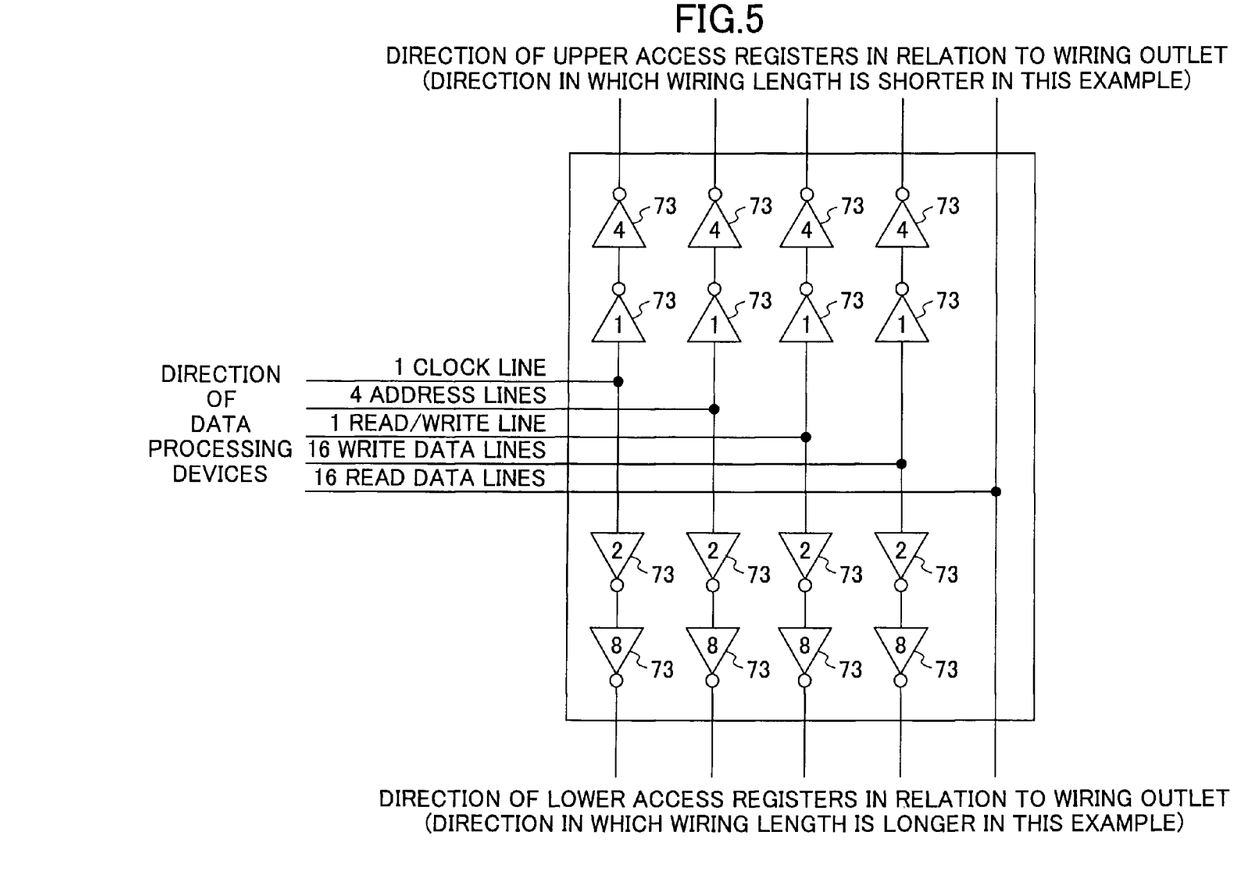
FIG. 5 illustrates a circuit diagram of wiring outlets in a processor element block of an image processing apparatus according to the third embodiment.

Next is described the third embodiment of the present invention with reference to FIG. 5. Note that the same reference numerals are given to the components which are common to the above-described first and second embodiments, and their explanations are omitted. FIG. 5 illustrates a circuit diagram of each wiring outlet 72 provided in the processor element block 4 of the image processing apparatus 1 according to the third embodiment.

In the image processing apparatus 1 of the first and second embodiments above, the wiring outlets 72 provided in the processor element block 4 for the respective data processing devices 5 are not concentrated near the central part of the processor element block 4 but disposed in a dispersed manner in both the upper and lower directions of FIGS. 3 and 4.

That is, some wiring outlets 72 are disposed not in the middle but to the upper or lower side, in the processor element block 4. In this case, the bifurcating-line sets extending to the upper end and to the lower end from each of such wiring outlets 72 have different length. Therefore, the number of access registers connected to the upper bifurcating-line set and the number connected to the lower bifurcating-line set (in relation to the wiring outlet 72) are different.

According to the present embodiment, in order to improve the communication speed between the data processing devices 5 and the access registers, the bifurcating lines on each side are driven by different elements. Furthermore, a driving force of each driving element is changed according to the length of a corresponding bifurcating line and the number of access registers connected to the bifurcating line.

A detailed description is provided with reference to FIG. 5. In FIG. 5, two inverter gates 73 are connected in series and used as a driving element. Herewith, each line of one bifurcating-line set, which is longer in length and to which a larger number of access registers are connected compared to the corresponding line of the other bifurcating-line set, is driven by inverter gates 73 having larger driving forces. The number of each inverter gate 73 shown in FIG. 5 indicates that driving force of the inverter gate 73. For example, an inverter gate 73 with "4" has a driving force four times that of an inverter gate 73 with "1".

In the image processing apparatus 1 of the first and second embodiments, the data processing devices 5 and the processor elements are both one-dimensionally arranged in the same direction. Accordingly, as for common lines for data processing devices 5 disposed further away from the central part, it is necessary to provide a larger difference in driving force between the upper and lower bifurcating-line sets. Therefore, as for common lines for data processing devices 5 disposed at each end (i.e. the common lines connecting the data processing device 50 and the R0 registers, and the common lines connecting the data processing device 57 and the R7 registers in this case), it is necessary to provide a largest difference in driving force between the upper and lower bifurcating-line sets.

According to the present embodiment, a bifurcating-line set of one side of each wiring outlet 72 in the processor element block 4 and the other bifurcating-line set are separately driven by inverter gates 73 having different driving forces in accordance with their lengths and numbers of connected access registers. Herewith, it is possible to reduce variation in communication speed between the access registers in the processor element block 4 and the data processing devices 5, which results in communications speed-up.

In the image processing apparatus 1 according to the first and second embodiments above, the bifurcating-line sets extending from the wiring outlets 72 vary in length, and the number of access registers connected to the bifurcating-line sets also varies. Therefore, common lines for data processing devices 5 disposed on each end (i.e. the common lines between the data processing device 50 and the R0 register, and the common lines between the data processing device 57 and the R7 register in FIGS. 3 and 4) have a disadvantage in terms of communications speed. Therefore, the image processing apparatus 1 may be designed in such a manner that access registers connected to common lines for data processing devices 5 disposed further away from the central part communicate at slower speeds, and access registers connected to common lines for data processing devices 5 disposed closer to the central part communicate at faster speeds. For example, the frequency of the clock between a data processing device 5 and an access register is changed by that data processing device 5. Herewith, data processing devices 5 closer to the central part of the processor element block 4 (more specifically, the register file array 7) communicate at faster speeds, and data processing devices 5 closer to an end of the processor element block 4 (more specifically, the register file array 7) communicate at slower speeds. As a result, this allows the image processing apparatus 1 to have an optimal structure for exhibiting high performance as a whole.

Note that the present invention is not limited to the above-described embodiments. It should be understood that various changes and modification may be made to the embodiments without departing from the scope of the broad spirit and scope of the present invention.

This application is based on Japanese Patent Application No. 2008-011304 filed on Jan. 22, 2008, the contents of which are hereby incorporated herein by reference.

What is claimed is:

1. An image processing apparatus comprising:
a SIMD microprocessor in which a plurality of processor elements is arranged in one dimension, each of the processor elements including a plurality of access registers arranged in stages for storing image data; and
a plurality of data processing devices corresponding one-to-one with the stages of the access registers, arranged in one dimension in the same direction as the processor elements, and configured to read and write image data from/to the access registers;
wherein the access registers of each of the stages, each of which access registers is included in a different one of the processor elements, are connected with a common line, and
wiring outlets, each of which connects the common line of a different one of the stages to a corresponding data processing device, are individually disposed within the SIMD microprocessor in such a manner that each wiring outlet has a shortest possible distance to the corresponding data processing device.

2. The image processing apparatus as claimed in claim 1, wherein a first part and a second part of the common line are individually driven by driving elements having different driving forces, the first part extending from the corresponding wiring outlet to an endmost one of the access registers connected by the common line and the second part extending from the corresponding wiring outlet to the other endmost one of the connected access registers.

3. The image processing apparatus as claimed in claim 1, wherein each of the data processing devices includes a change unit configured to change communication speed in accordance with a length of the common line connected to the data processing device, the length being from the corresponding wiring outlet to a most distant one of the access registers connected by the common line.

4. A wiring outlet positioning method used on an image processing apparatus including a SIMD microprocessor in which a plurality of processor elements is arranged in one dimension, each of the processor elements including a plurality of access registers arranged in stages for storing image data; and a plurality of data processing devices corresponding one-to-one with the stages of the access registers, arranged in one dimension in the same direction as the processor elements, and configured to read and write image data from/to the access registers, the wiring outlet positioning method comprising the steps of:
providing a common line connecting the access registers of each of the stages, each of which access registers is included in a different one of the processor elements; and
individually disposing wiring outlets, each of which connects the common line of a different one of the stages to a corresponding data processing device, within the SIMD microprocessor in such a manner that each wiring outlet has a shortest possible distance to the corresponding data processing device.

5. The wiring outlet positioning method as claimed in claim 4, wherein a first part and a second part of the common line are individually driven by driving elements having different driving forces, the first part extending from the corresponding wiring outlet to an endmost one of the access registers connected by the common line and the second part extending from the corresponding wiring outlet to the other endmost one of the connected access registers.

6. The wiring outlet positioning method as claimed in claim 4, wherein each of the data processing devices includes a change unit configured to change communication speed in accordance with a length of the common line connected to the data processing device, the length being from the corresponding wiring outlet to a most distant one of the access registers connected by the common line.

* * * * *